United States Patent
Hayton et al.

(10) Patent No.: US 9,253,278 B2
(45) Date of Patent: Feb. 2, 2016

(54) USING ENTITY TAGS (ETAGS) IN A HIERARCHICAL HTTP PROXY CACHE TO REDUCE NETWORK TRAFFIC

(75) Inventors: Stuart J. Hayton, Portsmouth (GB); David R. Jones, Eastleigh (GB); Alwyn R. Lobo, Bangalore (IN); Robert B. Nicholson, Southsea (GB); Graeme P. Vetterlein, Crowthorne (GB)

(73) Assignee: International Business Machines Corporation, Armonk, NY (US)

( * ) Notice: Subject to any disclaimer, the term of this patent is extended or adjusted under 35 U.S.C. 154(b) by 197 days.

(21) Appl. No.: 13/360,891

(22) Filed: Jan. 30, 2012

(65) Prior Publication Data

US 2013/0198313 A1   Aug. 1, 2013

(51) Int. Cl.
| | |
|---|---|
| G06F 15/167 | (2006.01) |
| H04L 29/08 | (2006.01) |
| G06F 21/64 | (2013.01) |
| H04L 29/06 | (2006.01) |

(52) U.S. Cl.
CPC ............ *H04L 67/2852* (2013.01); *G06F 21/64* (2013.01); *H04L 63/123* (2013.01); *H04L 63/1466* (2013.01); *H04L 67/02* (2013.01); *H04L 67/28* (2013.01); *H04L 67/2847* (2013.01); *H04L 69/04* (2013.01)

(58) Field of Classification Search
CPC ... H04L 67/02; H04L 63/1466; H04L 63/123; H04L 67/2847; H04L 67/28; H04L 69/04; G06F 21/64
USPC ........................................................ 709/213
See application file for complete search history.

(56) References Cited

U.S. PATENT DOCUMENTS

| | | |
|---|---|---|
| 5,699,526 A | 12/1997 | Siefert |
| 5,787,470 A | 7/1998 | DeSimone et al. |
| 5,878,218 A | 3/1999 | Maddalozzo, Jr. et al. |
| 5,991,306 A | 11/1999 | Burns et al. |
| 6,023,726 A | 2/2000 | Saksena |
| 6,112,231 A | 8/2000 | DeSimone et al. |

(Continued)

FOREIGN PATENT DOCUMENTS

| | | |
|---|---|---|
| WO | 2006081032 A2 | 8/2006 |
| WO | 2008112770 A2 | 9/2008 |
| WO | 2010029081 A1 | 3/2010 |

OTHER PUBLICATIONS

Hofmann et al., "Content Networking: Architecture, Protocols, and Practice", Morgan Kaufmann Publishers is an Imprint of Elsevier, San Francisco, CA, USA, Copyright 2005 by Lucent Technology and Leland R. Beaumont, ISBN: 1-55860-834-6.

(Continued)

*Primary Examiner* — Richard G Keehn
*Assistant Examiner* — Mohammed Ahmed
(74) *Attorney, Agent, or Firm* — Jason H. Sosa

(57) ABSTRACT

Disclosed is a program for validating a web cache independent of an origin server. A computer in between a client computer and the origin server computer receives a request for a resource and an entity tag (ETag) corresponding to the request. The computer forwards the request to the origin server and subsequently receives the resource. The computer generates an ETag for the received resource and compares the generated ETag to the ETag corresponding to the request. If the ETags match, the computer sends an indication toward the client computer that the resource has not been modified.

8 Claims, 3 Drawing Sheets

(56) References Cited

U.S. PATENT DOCUMENTS

| | | | |
|---|---|---|---|
| 6,330,561 | B1 | 12/2001 | Cohen et al. |
| 7,113,935 | B2 | 9/2006 | Saxena |
| 7,451,225 | B1 | 11/2008 | Todd et al. |
| 7,930,402 | B2 | 4/2011 | Swildens et al. |
| 8,103,783 | B2 | 1/2012 | Plamondon |
| 8,224,964 | B1 | 7/2012 | Fredrickson et al. |
| 8,255,570 | B2 | 8/2012 | Samuels et al. |
| 8,275,829 | B2 | 9/2012 | Plamondon |
| 8,352,605 | B2 | 1/2013 | Samuels et al. |
| 8,364,785 | B2 | 1/2013 | Plamondon |
| 8,504,775 | B2 | 8/2013 | Plamondon |
| 8,505,057 | B2 | 8/2013 | Rogers |
| 8,615,583 | B2 | 12/2013 | Plamondon |
| 9,055,118 | B2* | 6/2015 | Lobo ............... H04L 67/2842 1/1 |
| 2001/0051927 | A1 | 12/2001 | London et al. |
| 2003/0115281 | A1 | 6/2003 | McHenry et al. |
| 2003/0187917 | A1* | 10/2003 | Cohen ............... H04L 67/1095 709/203 |
| 2003/0188106 | A1* | 10/2003 | Cohen ............... H04L 67/1095 711/133 |
| 2005/0033926 | A1* | 2/2005 | Dumont ............ G06F 17/30902 711/138 |
| 2005/0102282 | A1 | 5/2005 | Linden |
| 2005/0193096 | A1 | 9/2005 | Yu et al. |
| 2006/0123340 | A1 | 6/2006 | Bailey et al. |
| 2006/0129533 | A1 | 6/2006 | Purvis |
| 2006/0195660 | A1* | 8/2006 | Sundarrajan ........ H04L 69/329 711/118 |
| 2007/0047719 | A1* | 3/2007 | Dhawan ............. H04M 1/2478 379/235 |
| 2007/0156852 | A1* | 7/2007 | Sundarrajan ...... G06F 17/30902 709/219 |
| 2007/0250601 | A1 | 10/2007 | Amlekar et al. |
| 2008/0195819 | A1 | 8/2008 | Dumont |
| 2008/0228772 | A1 | 9/2008 | Plamondon |
| 2008/0229017 | A1* | 9/2008 | Plamondon ........ H04L 67/2847 711/118 |
| 2008/0256249 | A1* | 10/2008 | Siress ............... H04L 63/104 709/229 |
| 2008/0320151 | A1 | 12/2008 | McCanne et al. |
| 2008/0320225 | A1* | 12/2008 | Panzer ............. G06F 17/30902 711/130 |
| 2009/0010163 | A1* | 1/2009 | Isomura ............. H04W 28/08 370/235 |
| 2009/0083279 | A1 | 3/2009 | Hasek |
| 2009/0083494 | A1 | 3/2009 | Bhanoo et al. |
| 2009/0094417 | A1 | 4/2009 | Carlson et al. |
| 2010/0002817 | A1 | 1/2010 | Vrcelj et al. |
| 2010/0063995 | A1* | 3/2010 | Chen ................ H04L 67/2852 709/203 |
| 2010/0107234 | A1* | 4/2010 | Aldor ................. G06F 21/64 726/9 |
| 2010/0281217 | A1* | 11/2010 | Sundarrajan et al. ......... 711/118 |
| 2011/0023105 | A1* | 1/2011 | Islam ................ H04L 45/52 726/11 |
| 2011/0055021 | A1* | 3/2011 | Haag ................ G06Q 30/0273 705/14.69 |
| 2011/0191449 | A1 | 8/2011 | Swildens et al. |
| 2011/0205585 | A1* | 8/2011 | Mihara ................ G06F 3/1203 358/1.15 |
| 2011/0238828 | A1 | 9/2011 | Grigsby et al. |
| 2011/0320523 | A1 | 12/2011 | Chan et al. |
| 2012/0017034 | A1 | 1/2012 | Maheshwari et al. |
| 2012/0042264 | A1 | 2/2012 | Burckart et al. |
| 2012/0089781 | A1 | 4/2012 | Ranade et al. |
| 2012/0226767 | A1 | 9/2012 | Luna et al. |
| 2012/0271908 | A1* | 10/2012 | Luna ................ G06F 9/5016 709/216 |
| 2012/0284356 | A1* | 11/2012 | Luna ............... G06F 17/30902 709/213 |
| 2012/0290646 | A1* | 11/2012 | Sundarrajan ........ H04L 67/2852 709/203 |
| 2012/0311648 | A1 | 12/2012 | Swildens et al. |
| 2013/0086197 | A1 | 4/2013 | Ho et al. |
| 2013/0086323 | A1 | 4/2013 | Kadlabalu |
| 2013/0132472 | A1* | 5/2013 | Sundarrajan ........... H04L 67/42 709/203 |
| 2013/0159274 | A1* | 6/2013 | Silberstein ............. H04L 67/20 707/706 |
| 2013/0173756 | A1 | 7/2013 | Luna et al. |
| 2013/0179545 | A1* | 7/2013 | Bishop .................... H04L 67/42 709/219 |
| 2013/0198313 | A1* | 8/2013 | Hayton ............... H04L 67/2852 709/213 |
| 2013/0204961 | A1 | 8/2013 | Fliam et al. |
| 2013/0254385 | A1 | 9/2013 | Lyon |
| 2014/0019577 | A1 | 1/2014 | Lobo et al. |
| 2014/0068402 | A1 | 3/2014 | Mir et al. |
| 2014/0280522 | A1* | 9/2014 | Watte ................ H04L 51/04 709/203 |

OTHER PUBLICATIONS

Fielding et al., "HTTP/1.1: Protocol Parameters", Part of Hypertext Transfer Protocol—HTTP/1.1, RFC 2616, section 3 [online], [retrieved on Dec. 9, 2011]. Retrieved from the Internet <URL: http://www.w3.org/Protocols/rfc2616/rfc2616-sec3.html>.

Fielding et al., "HTTP/1.1: Caching in HTTP", Part of Hypertext Transfer Protocol—HTTP/1.1, RFC 2616, section 13 [online], [retrieved on Dec. 9, 2011]. Retrieved from the Internet <URL: http://www.w3.org/Protocols/rfc2616/rfc2616-sec13.html>.

Wikipedia, "HTTP ETag", Published on: Feb. 17, 2011, Wikipedia, the free encyclopedia [online], [retrieved on Dec. 9, 2011]. Retrieved from the Internet <URL: http://en.wikipedia.org/w/index.php?title=HTTP_ETag&oldid=414457380>.

Fielding et al., "HTTP/1.1: Header Field Definitions", Part of Hypertext Transfer Protocol—HTTP/1.1, RFC 2616, section 14 [online], [retrieved on Jun. 29, 2012]. Retrieved from the Internet <URL: http://www.w3.org/Protocols/rfc2616/rfc2616-sec14.html>.

Holt, "YouTube in Talks with Mobile Providers, Manufacturers Over Network Deal" scribbal.com, Jun. 8, 2011 [online], [retrieved on May 24, 2012]. Retrieved from the Internet <URL: http://www.scribbal.com/2011/06/youtube-in-talks-with-mobile-providers-manufacturers-over-network-deal/>.

Knowlton, "Edge Caching for Media Delivery" learn.iis.net, Published: Mar. 18, 2009, Updated: Feb. 9, 2011 [online], [retrieved on May 24, 2012]. Retrieved from the Internet <URL: http://learn.iis.net/page.aspx/621/edge-caching-for-media-delivery/>.

Potencier, "Caching on the Edge with Symfony2" slideshare.net, Jun. 24, 2010 [online], [retrieved on May 24, 2012]. Retrieved from the Internet <URL: http://www.slideshare.net/fabpot/caching-on-the-edge-with-symfony2>.

U.S. Appl. No. 13/548,584, entitled "Intelligent Edge Caching", filed Jul. 13, 2012.

Yin et al., "Engineering Web Cache Consistency" ACM Transactions on Internet Technology, vol. 2, No. 3, Aug. 2002, pp. 224-259 [online], [retrieved on May 24, 2012]. Retrieved from the Internet <URL: http://www.cs.utexas.edu/~lorenzo/papers/toit.pdf>.

Michael J. Wright; "Constituencies for Users: How to Develop them by Interpreting Logs of Web Site Access"; KMi Knowledge Media Institute; AAAI Spring Symposium on Intelligent Agents in Cyberspace; Mar. 22-24, 1999; Stanford University California.

* cited by examiner

USING ENTITY TAGS (ETAGS) IN A HIERARCHICAL HTTP PROXY CACHE TO REDUCE NETWORK TRAFFIC

FIELD OF THE INVENTION

The present invention relates generally to the field of data transfer over a computer network, and more particularly to cache validation to reduce the amount of data necessary to be transferred.

BACKGROUND OF THE INVENTION

The Hypertext Transfer Protocol (HTTP) is an application protocol for distributed information systems and is the foundation of data communication for the World Wide Web. A client computer submits an HTTP request message to a server computer. The server, which stores content, or provides resources, such as HTML files, or performs other functions on behalf of the client, returns a response message to the client. A response contains completion status information about the request and may contain any content requested by the client in its message body. The HTTP protocol is designed to permit intermediate network elements, such as proxy servers, to improve or enable communications between clients and servers.

An intermediate server between the requesting client computer and the origin server may cache responses from the origin server and return subsequent requests for the same content directly. A cache hierarchy is a collection of caching proxy servers organized in a logical parent/child arrangement so that caches closest to the origin server act as parents to caches closer to the client computer. For example, a request from a client computer to an origin server computer may go through a series of proxy servers arranged in a hierarchical manner. The first proxy server receiving the request searches its cache for the proper content. If the content is not found (termed a "cache miss"), the first proxy server requests the content from the next proxy server in the hierarchical line which in turn searches its own cache. If the "parent" locates the content ("cache hit"), it returns the content to the "child" without passing the request further. The child, in turn, returns the content to the client computer.

When a cache has a stale entry that it would like to use as a response to a client's request, it first has to check with the origin server (or possibly an intermediate cache with a fresh response) to see if its cached (stale) entry is still usable. This is known as "validating" the cache entry. An entity tag, or ETag, is part of the HTTP protocol. More specifically, ETags are part of HTTP version 1.1 or later as earlier versions did not support ETags. ETags are one mechanism that HTTP provides for cache validation, and which allow a client to make conditional requests. This allows caches to be more efficient, and saves bandwidth, as a server does not need to send a full response if the content has not changed.

An ETag is an opaque identifier typically assigned by an origin server to a specific version of a resource found at a uniform resource locator (URL). "Opaque" is used to denote that the ETag is unique to the computer generating the ETag. Another computer generating an ETag on the same version of the same resource would not produce the same ETag. If the resource content at the URL ever changes, a new and different ETag is assigned. Used in this manner, ETags can be quickly compared to determine if two versions of a resource are the same or are different. The use of ETags in the HTTP header is optional.

In typical usage, when a computer requests a resource, the server assigns an ETag to the resource and returns the resource along with the corresponding ETag value, which is placed in an HTTP "ETag" header field. The computer may then cache the resource along with the corresponding ETag. Later, if the computer requests the same resource, the computer sends the request and the ETag, the ETag being in an "If-None-Match" HTTP header field. On this subsequent request, the server may now compare the client's ETag with the ETag for the current version of the resource. If the ETag values match, meaning that the resource has not changed, then the server may send back a very short response with an HTTP "not modified" status. This status tells the computer that its cached version is current and should be used, saving the bandwidth that would otherwise be used to send the resource.

SUMMARY

Aspects of an embodiment of the present invention disclose a method, computer system, and computer program product for validating a web cache independent of an origin server computer. The method comprises a first computer, connectedly disposed between a second computer and a third computer, receiving a request for a resource stored on the second computer from the third computer, the request having an entity tag (ETag) corresponding to a cached version of the resource stored on the third computer. The method further comprises the first computer forwarding the request for the resource to the second computer and receiving a copy of the resource from the second computer. The method further comprises the first computer generating an ETag for the copy of the resource received from the second computer. The method further comprises the first computer comparing the generated ETag with the ETag corresponding to the cached version of the resource, and in response to determining that the generated ETag and the ETag corresponding to the cached version match, the first computer sending a response to the third computer indicating that the cached version of the resource is the same as the resource on the second computer.

DETAILED DESCRIPTION

Figure 1:
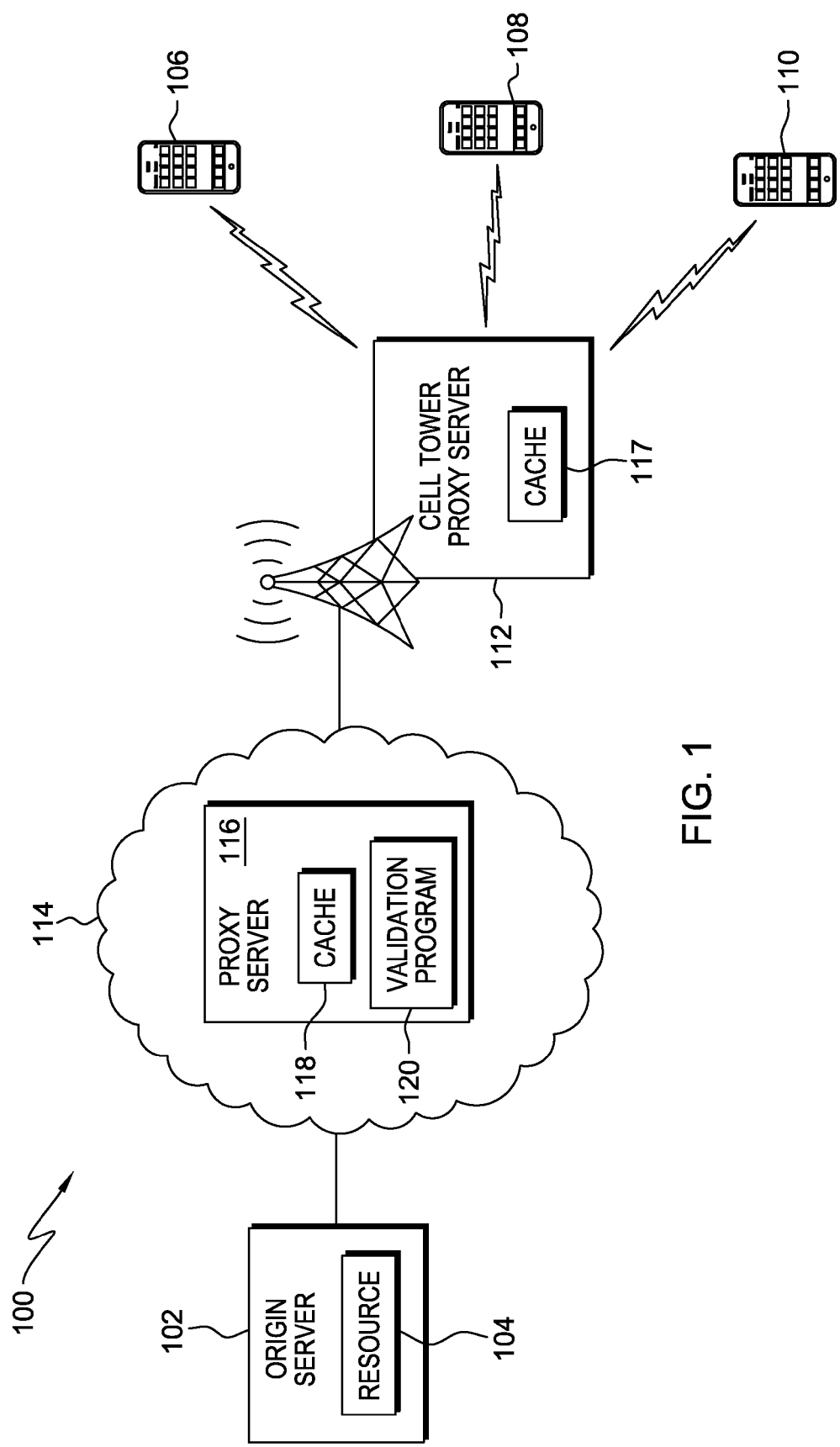
FIG. 1 is a block diagram of a distributed network data processing system according to an embodiment of the present invention.

The present invention will now be described in detail with reference to the Figures. FIG. 1 illustrates a distributed data processing system, generally designated 100, according to one embodiment of the present invention.

In the illustrated embodiment, distributed data processing system 100 comprises origin server computer 102, containing resource 104, and client computing devices 106, 108, and 110 connected to origin server computer 102 via a cell tower proxy server computer 112 and network 114.

In the depicted embodiment, origin server computer 102 is a web server containing content desired by a client computing device, i.e., resource 104. One example of resource 104 is an html file. Origin server computer 102 may be a computer system, a desktop, a notebook, a laptop computer, a tablet computer, a thin client, or any other electronic device or computing system capable of sending and receiving information via a network. In another embodiment, origin server computer 102 may represent a computing system utilizing clustered computers and components to act as a single pool of seamless resources when accessed through a network. This is a common implementation for datacenters and for cloud computing applications.

Respective client computing devices 106, 108, and 110 are, in one embodiment, handheld devices or smart-phones. In other embodiments, client computing devices 106, 108, and 110 may be any computer system capable of communicating with origin server computer 102.

Client computing devices 106, 108, and 110 communicate with origin server computer 102 via network 114. In the depicted embodiment, client computing devices 106, 108, and 110 are smart-phones connected to network 114 via a cell tower, where the cell tower contains the cell tower proxy server 112. In an alternate embodiment, client computing devices 106, 108, and 110 may connect directly to network 114.

Network 114 may include connections, such as wire, wireless communication links, or fiber optic cables, as well as at least one intermediate proxy server, e.g., proxy server computer 116, capable of relaying information between origin server computer 102 and one of client computing devices 106, 108, and 110. In some embodiments, a series of proxy servers may be utilized to make the connection. A person of ordinary skill in the art will understand that cell tower proxy server 112 may also be considered part of network 114.

In an exemplary operation scenario, a client computing device, such as client computing device 106, requests resource 104 from origin server 102. The request is relayed to cell tower proxy server 112. Cell tower proxy server 112 searches for a copy of resource 104 in cache 117, finds a copy of the resource, but cannot verify that the copy is current. The request is forwarded towards origin server 102. Proxy server 116 is a computer in the communication line between cell tower proxy server 112 and origin server 102, and hence, receives the request in turn. Similarly, even if proxy server 116 has a copy of resource 104 in its cache 118, the proxy server is unable to verify that the copy is current at this point, and forwards the request towards origin server 102. If origin server 102 does not support cache validation, then even if the copy of resource 104 in either cache 117 or 118 is current, the origin server returns a new copy of the resource, unnecessarily taking up bandwidth. Ordinarily, the new copy of resource 104 is relayed all the way back to client computing device 106. However, validation program 120 on proxy server computer 116 generates and applies ETags to resources independent of origin server computer 102. When a request is received at proxy server computer 116, validation program 120 keeps track of an ETag associated with the request, and upon subsequently receiving the new copy of the resource from origin server computer 102, generates an ETag on the new copy and compares it to the ETag associated with the request. If the ETags match, validation program 120 sends a "not modified" response back toward cell tower proxy server 112 without having to send the entire new copy of resource 104, thus saving bandwidth between proxy server 116 and at least cell tower proxy server 112.

A person of ordinary skill in the art will recognize that validation program 120 may run on any computer intermediate to an origin server computer and a client computing device. However, in the preferred embodiment, validation program 120 runs on a computer intermediate to an origin server computer and a low capacity network link between the proxy server computer executing the validation program and the client computing device. One such example is the link between a cell tower and a core network. Embodiments of the present invention recognize that the bandwidth of a core network, such as network 114, is typically many gigabits/sec. However, the link from a cell tower to the core network often only has a capacity of a few megabits/sec. With many mobile computing devices connecting through a cellular network, each cell tower may receive many times more bites per second than can be relayed to the core network, often causing a bottleneck. Validation program 120 prevents redundant data from being transferred over this lower capacity link.

Proxy server computer 116, executing validation program 120, can include internal and external components (depicted in FIG. 3) as described in more detail below.

Figure 2:
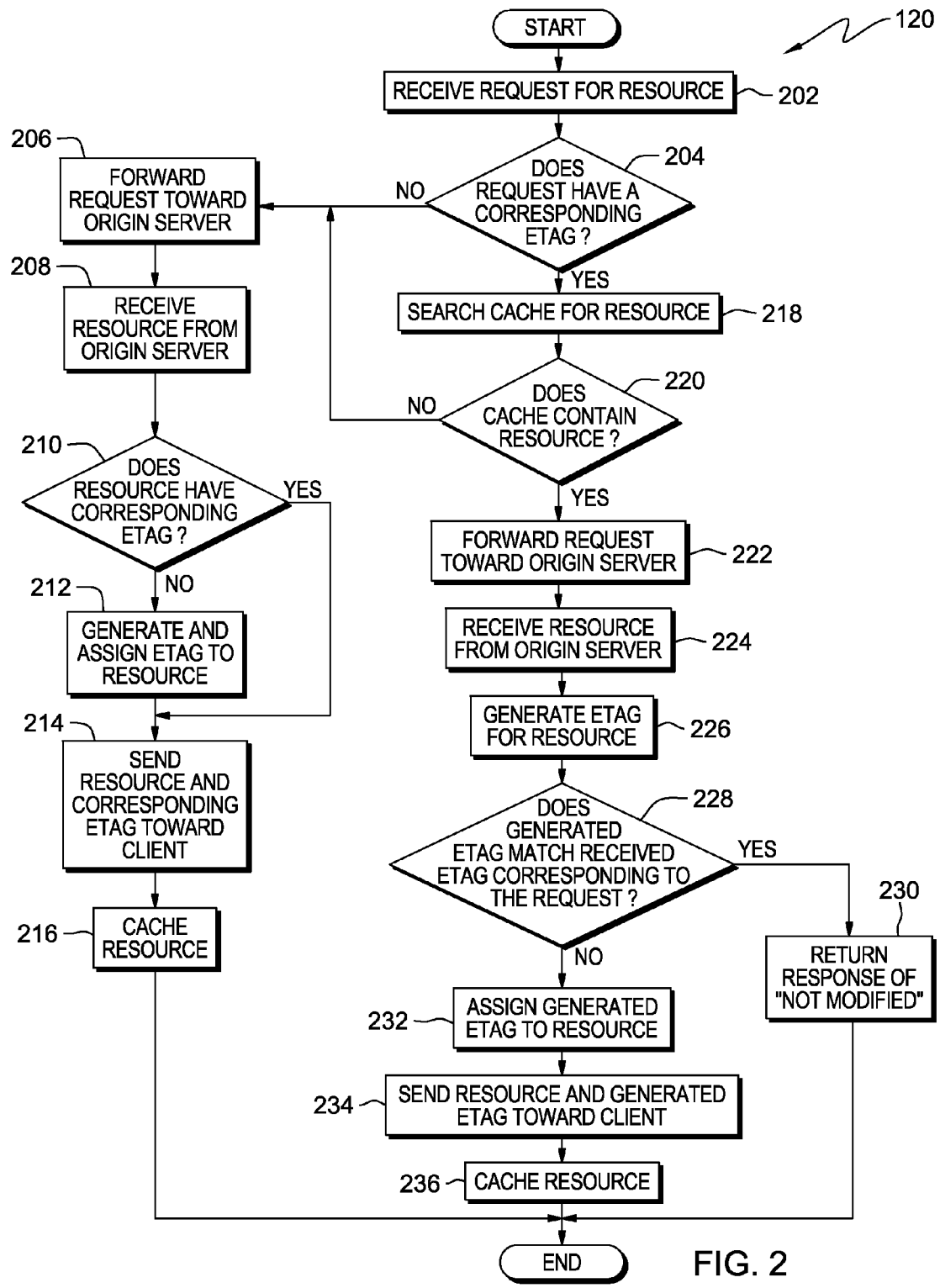
FIG. 2 is a flowchart of the steps of a validation program on a proxy server computer within the network data processing system of FIG. 1, in accordance with an embodiment of the present invention.

FIG. 2 is a flowchart depicting the steps of validation program 120 for validating a cache entry, in accordance with an embodiment of the present invention.

Validation program 120 executes on a proxy server computer in the line of communication between a client computing device and an origin server. Validation program 120 begins by receiving a request for a resource from the client computing device (step 202). The request may have gone through any number of intermediate computers prior to the proxy server computer that validation program 120 executes on, including, in the preferred embodiment, cell tower proxy server 112.

Validation program 120 determines whether the received request has a corresponding ETag (decision block 204). The ETag may have been added to a header of the request by the client computing device or any other intermediate computer prior to the proxy server computer that contains a copy of the requested resource in its cache, so that the contents of the cache may be validated. For example, the client computing device may have a copy of the desired resource and a corresponding ETag in a cache on the client computing device. Without knowing that the copy of the resource is valid, the client computing device sends a request for the resource with the ETag in a header to conditionally request the resource from the origin server if the server's copy of the resource is different from the client computing device's copy. In another example, the client computing device desires a resource and does not have a copy of the resource in a local cache. The client computing device unconditionally requests the resource. The request is received by an intermediate computer, such as cell tower proxy server 112, which does have a copy of the resource and a corresponding ETag in a local cache. Unable to determine if the cached copy is current, the intermediate computer forwards the request towards the origin server and includes the corresponding ETag in a header, making the request conditional upon the resource being different from the intermediate computer's copy. Now if the ETag is matched at a subsequent computer, a "not modified" response indicates to the intermediate computer that its copy is valid. The intermediate computer returns a copy of its now validated copy of the resource to the client computing device.

If the request received at the proxy server computer executing validation program 120 does not have a corresponding ETag (negative branch of decision 204), then validation program 120 assumes that this is a fresh or first request for the resource and, in response, forwards the request toward the origin server (step 206). There may be any number of intermediate computers between the origin server and the proxy server computer.

As mentioned previously, ETags are unique to the computer that created the ETags. In an alternative embodiment, validation program 120 also determines if a received ETag corresponding to the request was generated by the proxy server computer that validation program 120 resides on. If the ETag was not created by the proxy server computer, validation program 120 may treat the request as not having an ETag, proceeding to step 206 to forward to request (and any existing headers) toward the origin server.

After forwarding the request to the origin server, validation program 120 subsequently receives the resource from the origin server (step 208). Validation program 120 determines if the received resource has a corresponding ETag (decision block 210). A received resource not having an ETag indicates that the origin server does not validate web caches and that a full response is required from the origin server. Responsive to determining that the received resource does not have a corresponding ETag (negative branch of decision 210), validation program 120 generates an ETag for the resource, generally by using a hash across the content of the resource, and assigns the ETag to the resource (step 212). Validation program 120 sends the received resource, along with the corresponding ETag, towards the client computer device (step 214). If, on the other hand, validation program 120 determines that the received resource did have a corresponding ETag (positive branch of decision 210), validation program 120 skips the generation and assignment of an ETag in step 212, and sends the received resource and the received corresponding ETag towards the client computing device (step 214).

Validation program 120 caches a copy of the resource, including the ETag, at the proxy server computer for future use (step 216).

Returning back to decision block 204, if validation program 120 determines that the request received from the client computing device does have a corresponding ETag (positive branch of decision 204), validation program 120 searches the cache in the proxy server computer for the resource (step 218). Validation program 120 determines whether the cache contains a copy of the requested resource (decision block 220), and if the cache does not have a copy of the resource (negative branch of decision 220), may, in one embodiment, assume that the ETag was not assigned at the proxy server computer, and treat the request like a fresh request by proceeding to step 206.

If validation program 120 finds a copy of the requested resource in the cache (positive branch of decision 220), validation program 120 forwards the request to the origin server (step 222), subsequently receives the resource from the origin server (step 224), and generates an ETag based on the resource received from the origin server (step 226). Validation program 120 compares the generated ETag to the ETag corresponding to the request and determines if a match exists (decision block 228).

If validation program 120 determines that the generated ETag matches the ETag corresponding to the request (yes branch of decision 228), validation program 120 sends a response of "not modified" back towards the client computing device (step 230), allowing the cache with a current copy of the resource (either from an intermediate computer like cell tower proxy server 112 or the client computing device itself) to return to the client, or use (if it is the client) its own copy of the resource. Alternatively, if validation program 120 determines that the generated ETag does not match the ETag corresponding to the request (no branch of decision 228), validation program 120 assigns the generated ETag to the resource received from the origin server (step 232) and sends the resource and the generated ETag towards the client computing device (step 234). Validation program 120 caches a copy of the resource, including the generated ETag, for future use (step 236).

Figure 3:
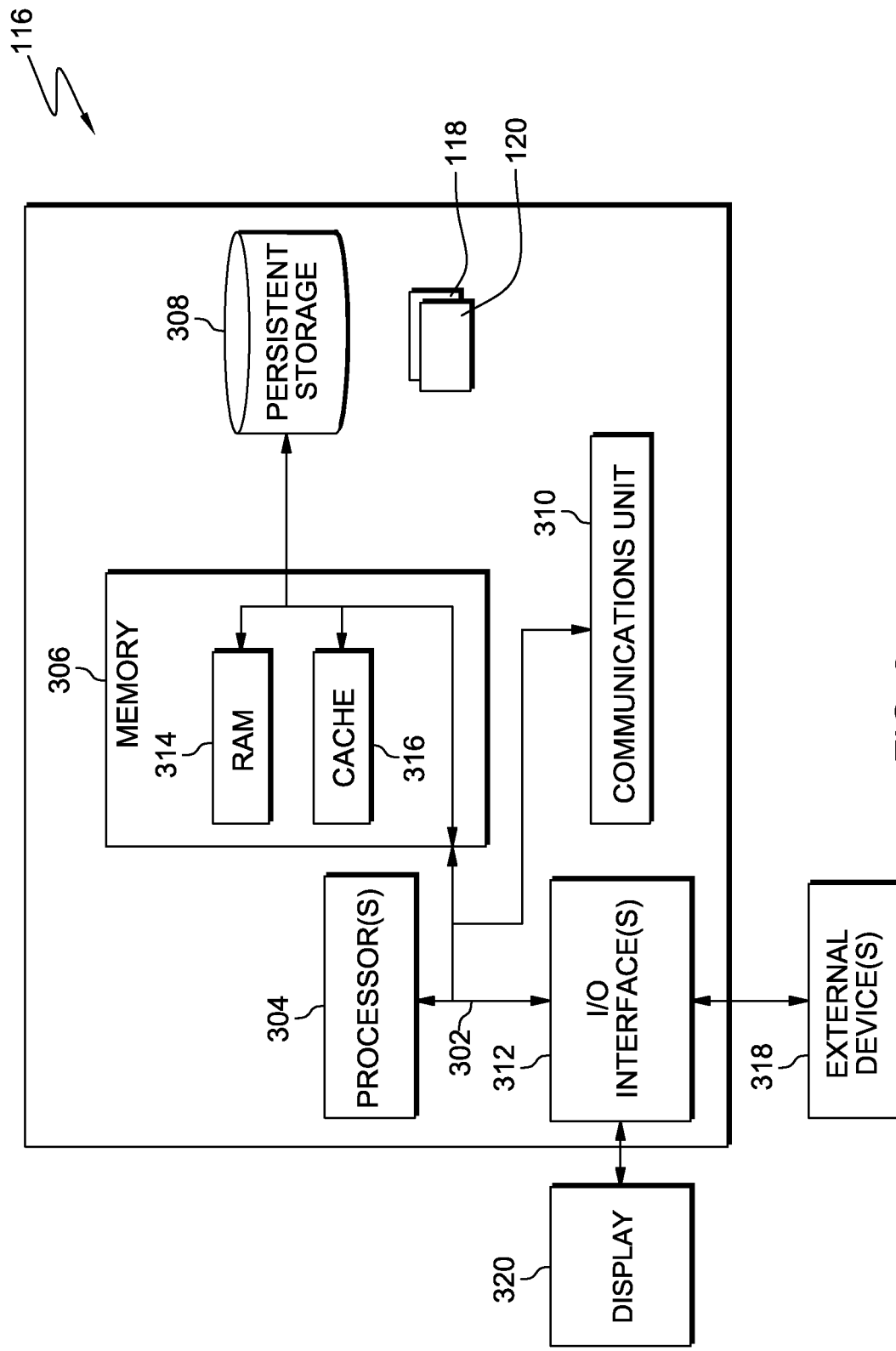
FIG. 3 depicts a block diagram of internal and external components of the proxy server computer.

FIG. 3 depicts a block diagram of components of proxy server 116 in accordance with an illustrative embodiment. It should be appreciated that FIG. 3 provides only an illustration of one implementation and does not imply any limitations with regard to the environment in which different embodiments may be implemented. Many modifications to the depicted environment may be made.

Proxy server 116 includes communications fabric 302, which provides communications between processor(s) 304, memory 306, persistent storage 308, communications unit 310, and input/output (I/O) interface(s) 312.

Memory 306 and persistent storage 308 are examples of computer-readable tangible storage devices. A storage device is any piece of hardware that is capable of storing information, such as, data, program code in functional form, and/or other suitable information on a temporary basis and/or permanent basis. Memory 306 may be, for example, one or more random access memories (RAM) 314, cache memory 316, or any other suitable volatile or non-volatile storage device.

Validation program 120 and web cache 118 are stored in persistent storage 308 for execution by one or more of the respective processors 304 via one or more memories of memory 306. In the embodiment illustrated in FIG. 3, persistent storage 308 includes flash memory. Alternatively, or in addition to, persistent storage 308 may include a magnetic disk storage device of an internal hard drive, a solid state drive, a semiconductor storage device, read-only memory (ROM), EPROM, or any other computer-readable tangible storage device that is capable of storing program instructions or digital information.

The media used by persistent storage 308 may also be removable. For example, a removable hard drive may be used for persistent storage 308. Other examples include an optical or magnetic disk that is inserted into a drive for transfer onto another storage device that is also a part of persistent storage 308, or other removable storage devices such as a thumb drive or smart card.

Communications unit 310, in these examples, provides for communications with other computers and devices. In these examples, communications unit 310 includes one or more network interface cards. Communications unit 310 may provide communications through the use of either or both physical and wireless communications links. In another embodiment still, proxy server 116 may be devoid of communications unit 310. Validation program 120 may be downloaded to persistent storage 308 through communications unit 310.

I/O interface(s) 312 allows for input and output of data with other devices that may be connected to proxy server 116. For example, I/O interface 312 may provide a connection to external devices 318 such as a keyboard, keypad, a touch screen, and/or some other suitable input device. I/O interface(s) may also connect to a display 320.

Display 320 provides a mechanism to display data to a user and may be, for example, a computer monitor.

The aforementioned programs can be written in various programming languages (such as Java or C++) including low-level, high-level, object-oriented or non object-oriented languages. Alternatively, the functions of the aforementioned programs can be implemented in whole or in part by computer circuits and other hardware (not shown).

Based on the foregoing, a method, computer system, and computer program product have been disclosed for validating a web cache independent of an origin server. However, numerous modifications and substitutions can be made without deviating from the scope of the present invention. In this regard, each block in the flowcharts or block diagrams may represent a module, segment, or portion of code, which comprises one or more executable instructions for implementing the specified logical function(s). It should also be noted that, in some alternative implementations, the functions noted in each block may occur out of the order noted in the figures. Therefore, the present invention has been disclosed by way of example and not limitation.

What is claimed is:

1. A method for validating a web cache, the method comprising the steps of:
   an intermediate computer, connectedly disposed between an origin server computer and a client computer, receiving a request for a resource stored on the origin server computer from the client computer;
   the intermediate computer forwarding the request for the resource to the origin server computer and receiving a first copy of the resource from the origin server computer;
   the intermediate computer determining that the received first copy of the resource does not have an associated ETag, and in response, generating a first ETag for the first copy of the resource received from the origin server computer, caching at least the generated first ETag, and sending the first copy of the resource to the requesting client computer;
   the intermediate computer receiving a subsequent request from the client computer, wherein the subsequent request seeks an updated version of the resource stored on the origin server computer and, if no updated version of the resource exists, validation of the client computer's cached version of the resource, the subsequent request including the first ETag, now corresponding to the cached version of the resource on the client computer;
   responsive to receiving the subsequent request, the intermediate computer requesting and receiving a second copy of the resource from the origin server computer, irrespective of whether the resource on the origin server has been modified since the previous request for the resource;
   subsequent to receiving the second copy of the resource from the origin server computer, the intermediate computer generating a new ETag for the second copy of the resource;
   the intermediate computer comparing the new ETag for the second copy of the resource with the first ETag to determine at the intermediate computer whether the resource on the origin server matches the cached version of the resource on the client computer;
   if the intermediate computer determines that the new ETag and the first ETag match, the intermediate computer sending a response to the client computer indicating that the cached version of the resource on the client computer is up to date; and
   if the intermediate computer determines that the new ETag does not match the first ETag, the intermediate computer caching at least the new ETag, and sending the second copy of the resource to the requesting client computer.

2. The method of claim 1, wherein the request for the resource originates at the client computer.

3. The method of claim 1, wherein the request for the resource originates at another computer and is forwarded by the client computer.

4. The method of claim 3, wherein the client computer receives the request for the resource from the other computer and inserts the first ETag into a header of the forwarded request.

5. A computer program product for validating a web cache, the computer program product comprising:
   one or more non-volatile computer-readable tangible storage devices and program instructions stored on at least one of the one or more non-volatile storage device, the program instructions comprising:
   program instructions to receive, at an intermediate computer, a request for a resource stored on an origin server computer from a client computer;
   program instructions to forward the request for the resource to the origin server computer and receive a first copy of the resource from the origin server computer;
   program instructions to determine that the received first copy of the resource does not have an associated ETag, and in response, generate a first ETag for the first copy of the resource received from the origin server computer, cache at least the generated first ETag at the intermediate computer, and send the first copy of the resource to the requesting client computer;
   program instructions to receive a subsequent request from the client computer, wherein the subsequent request seeks an updated version of the resource stored on the origin server computer and, if no updated version of the resource exists, validation of the client computer's cached version of the resource, the subsequent request including the first ETag, now corresponding to the cached version of the resource on the client computer;
   program instructions to, responsive to receiving the subsequent request, request and receive a second copy of the resource from the origin server computer, irrespective of whether the resource on the origin server has been modified since the previous request for the resource; program instructions to, subsequent to receiving the second copy of the resource from the origin server computer, generate a new ETag for the second copy of the resource;
   program instructions to compare the new ETag for the second copy of the resource with the first ETag to determine at the intermediate computer whether the resource on the origin server matches the cached version of the resource on the client computer;
   program instructions to, in response to determining that the new ETag and the first ETag match, send a response from the intermediate computer to the client computer indicating that the cached version of the resource on the client computer is up to date; and
   program instructions to, in response to determining that the new ETag and the first ETag do not match, cache at least the new ETag, and send the second copy of the resource to the requesting client computer.

6. The computer program product of claim 5, wherein the request for the resource originates at the client computer.

7. The computer program product of claim 5, wherein the request for the resource originates at another computer and is forwarded by the client computer.

8. A computer system for validating a web cache, the computer system comprising:
   one or more processors, one or more computer-readable tangible storage devices, and program instructions stored on at least one of the one or more storage device for execution by at least one of the one or more processors, the program instructions comprising:

program instructions to receive, at an intermediate computer, a request for a resource stored on an origin server computer from a client computer;
  program instructions to forward the request for the resource to the origin server computer and receive a first copy of the resource from the origin server computer;
  program instructions to determine that the received first copy of the resource does not have an associated ETag, and in response, generate a first ETag for the first copy of the resource received from the origin server computer, cache at least the generated first ETag at the intermediate computer, and send the first copy of the resource to the requesting client computer;
  program instructions to receive a subsequent request from the client computer, wherein the subsequent request seeks an updated version of the resource stored on the origin server computer and, if no updated version of the resource exists, validation of the client computer's cached version of the resource, the subsequent request including the first ETag, now corresponding to the cached version of the resource on the client computer;
  program instructions to, responsive to receiving the subsequent request, request and receive a second copy of the resource from the origin server computer, irrespective of whether the resource on the origin server has been modified since the previous request for the resource; program instructions to, subsequent to receiving the second copy of the resource from the origin server computer, generate a new ETag for the second copy of the resource;
  program instructions to compare the new ETag for the second copy of the resource with the first ETag to determine at the intermediate computer whether the resource on the origin server matches the cached version of the resource on the client computer;
  program instructions to, in response to determining that the new ETag and the first ETag match, send a response from the intermediate computer to the client computer indicating that the cached version of the resource on the client computer is up to date; and
  program instructions to, in response to determining that the new ETag and the first ETag do not match, cache at least the new ETag, and send the second copy of the resource to the requesting client computer.

* * * * *